April 30, 1929.  W. MEADOWCROFT  1,711,175
BOTTLE SIRUPING AND CROWN CORKING MACHINE
Filed July 17, 1923    4 Sheets-Sheet 1

INVENTOR
Wm. Meadowcroft
by Herbert W. Jenner
Attorney

April 30, 1929.  W. MEADOWCROFT  1,711,175
BOTTLE SIRUPING AND CROWN CORKING MACHINE
Filed July 17, 1923   4 Sheets-Sheet 2

INVENTOR
Wm. Meadowcroft.
by Herbert W. Penner
Attorney.

April 30, 1929.  W. MEADOWCROFT  1,711,175
BOTTLE SIRUPING AND CROWN CORKING MACHINE
Filed July 17, 1923  4 Sheets-Sheet 3
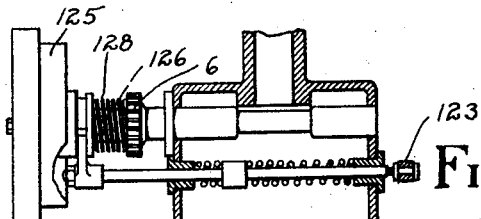
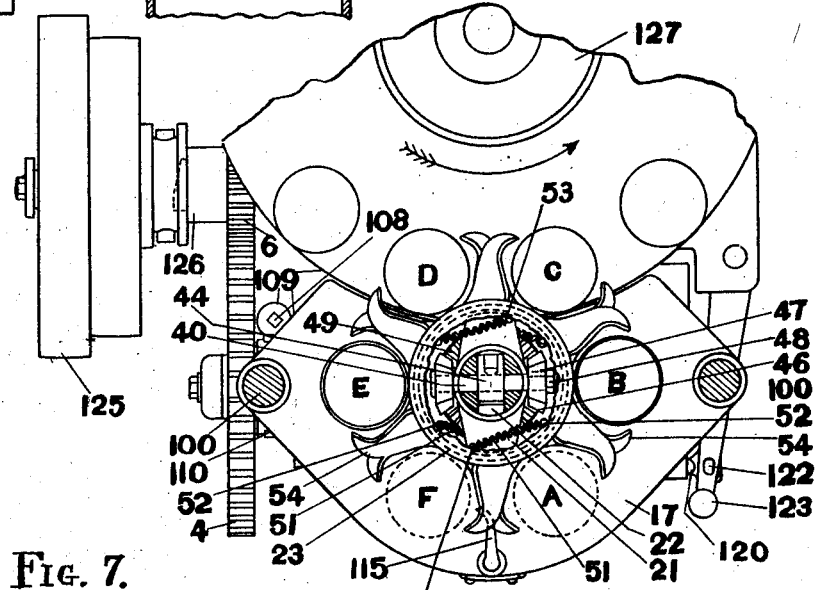
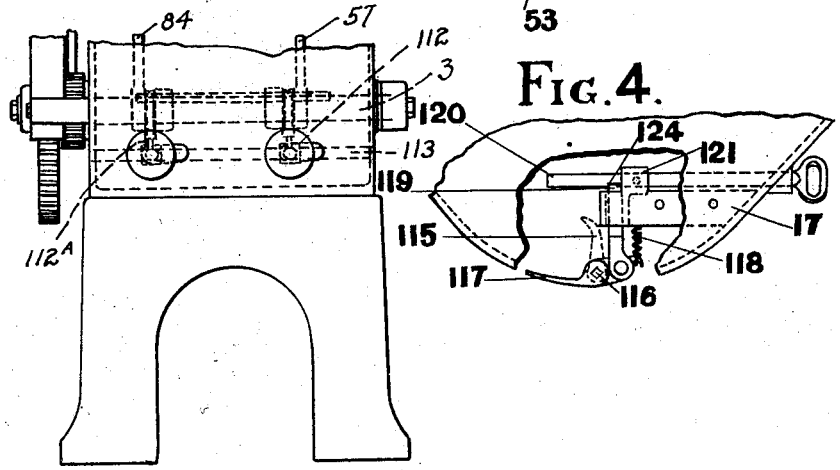
INVENTOR
Wm. Meadowcroft,
by Herbert W. Renner
Attorney April 30, 1929.  W. MEADOWCROFT  1,711,175
BOTTLE SIRUPING AND CROWN CORKING MACHINE
Filed July 17, 1923  4 Sheets-Sheet 4

INVENTOR
Wm. Meadowcroft,
by Herbert W. Jenner,
Attorney.

Patented Apr. 30, 1929.

1,711,175

UNITED STATES PATENT OFFICE.

WILLIAM MEADOWCROFT, OF BLACKBURN, ENGLAND.

BOTTLE-SIRUPING AND CROWN-CORKING MACHINE.

Application filed July 17, 1923, Serial No. 652,089, and in Great Britain September 19, 1922.

This invention relates to a bottle siruping and sealing machine which is specially designed for use in connection with a bottle filling machine of the rotary type, the chief object being to introduce a machine which will automatically transfer bottles from the operator's hand to the siruping mechanism, from the latter to the filling machine, from the filling machine to the sealing mechanism and from the latter to a position in which they can be removed by the operator thus avoiding the handling of bottles between the various operations. The machine is specially designed for dealing with bottles of varying lengths and diameters.

According to this invention a combined bottle siruping and sealing machine is provided with automatic bottle transferring apparatus adapted to convey bottles to a siruping head, to transfer them from the latter to a rotary filling machine, to take the filled bottles from the last mentioned machine and place them underneath the sealing mechanism and to transfer the sealed bottles to a position in which they can be removed from the siruping and sealing machine by the operator. The bottle transferring mechanism comprises a series of jaws adapted to receive an intermittent rotary motion about a central axis and provided with mechanism for enabling them to grip and release bottles of varying diameters. To accommodate bottles of varying lengths, mechanism is provided for raising and lowering the siruping and sealing heads and a feature of the invention relating to the siruping portion of the machine consists in so designing the thoroughfares as to obviate fobbing of sirup in the bottle and so give quieter filling when the bottles are automatically placed in the rotary bottle filler. The sealing portion of the machine comprises a hopper connected with a sealing head by a passage or chute and containing agitating mechanism for keeping the seals in motion in the hopper, and a device is also applied to the passage or chute for limiting the weight of the seals which can press against the side of the bottle neck and also for allowing a seal to enter the passage or chute to replace the seal placed on the bottle. Means are provided for enabling the siruping mechanism to be put out of operation or into operation at will to enable bottles to be filled, or filled and sealed, without being siruped. Means are also provided for enabling the sealing mechanism to be put into or out of operation at will for allowing bottles to be siruped and filled, or filled only, without being sealed, and means may also be provided for automatically stopping the machine in the event of a bottle not being removed by the operator after being transferred from underneath the sealing head to the taking off position and prevent it from again passing underneath the siruping head.

In order that the said invention may be clearly understood and readily carried into effect the same is described more fully with reference to the accompanying drawings, wherein:—

Figure 3 is a horizontal section of the siruping, crowning and bottle transferring machine, and Figure 4 is a plan of an automatic motion for stopping the machine if bottles are not removed.

Figure 6:
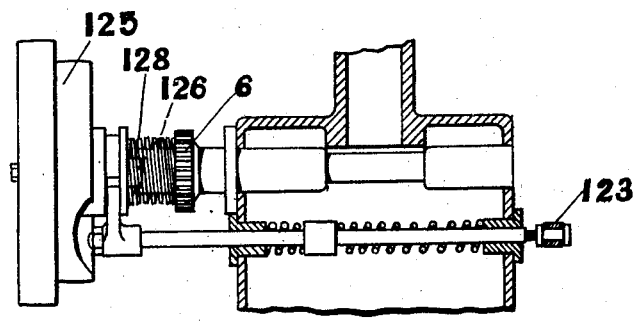
Figure 7:
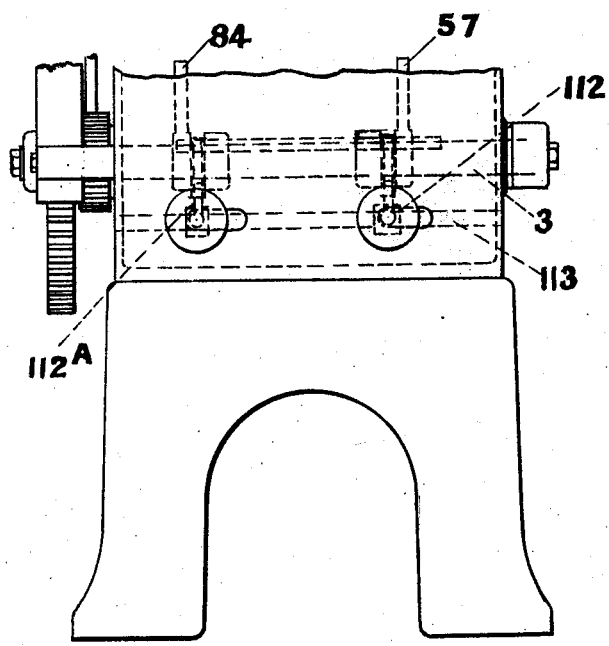

Fig. 6 is a detail view showing the connection of the clutch lever 123 with the clutch 126. Fig. 7 is a front view of the lower part of the machine showing the lever 112ᴬ for sliding the cam 84 into and out of its operative position.

Figure 1:
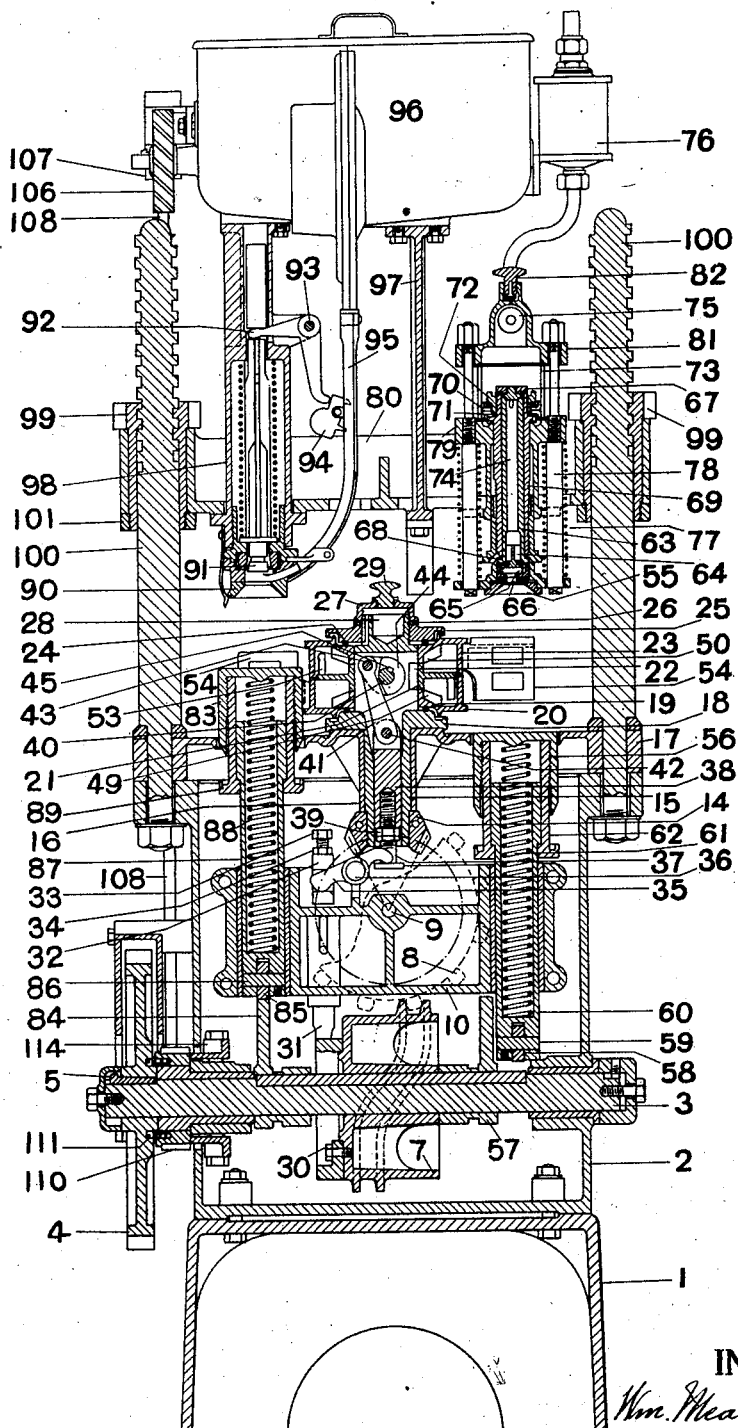
Figure 1 is a vertical section partly in elevation of a siruping, crowning and bottle transferring machine constructed in accordance with this invention.
Figures 2, 5:
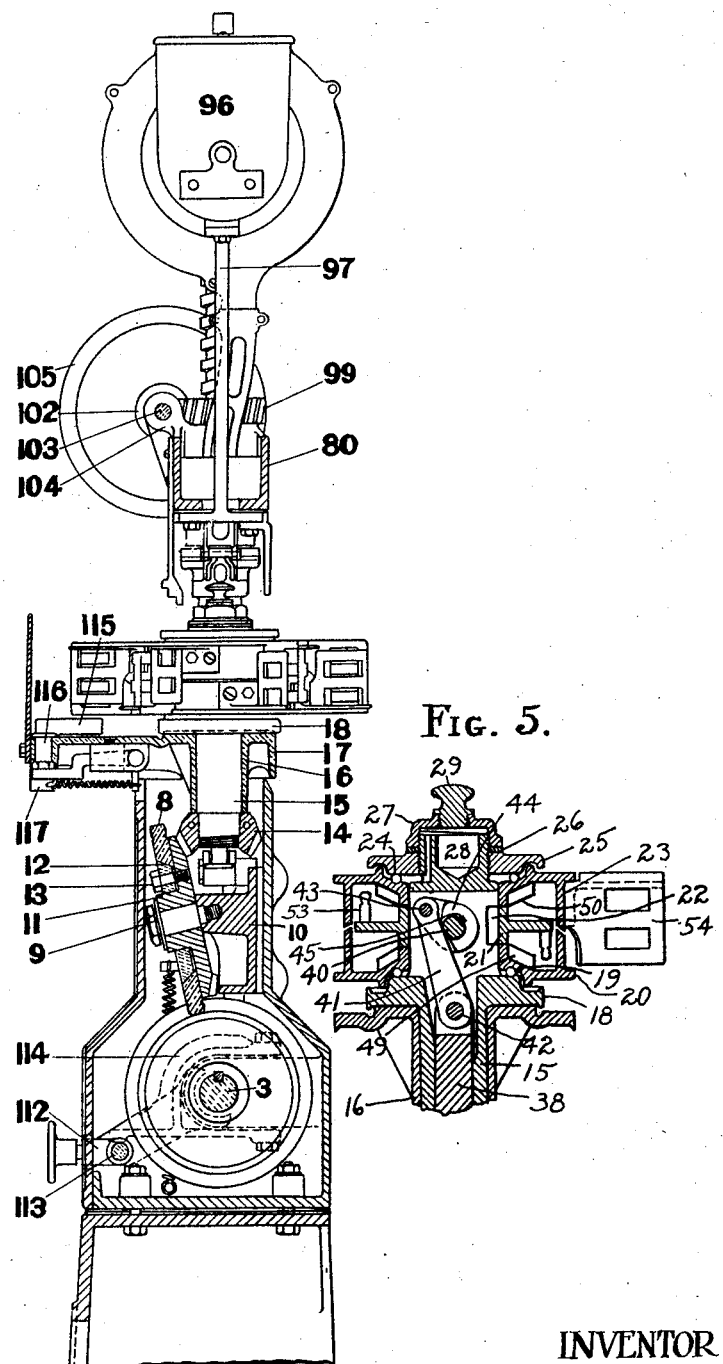
Figure 2 is a similar view taken at right angles to Figure 1 with some of the parts removed.
Fig. 5 is a vertical section of the bottle transfer mechanism as shown in Fig. 1, but drawn to a larger scale.

1 indicates the base casting to which is attached a frame 2 carrying a horizontal driving shaft 3 on which is fixed a gear wheel 4 by means of a key 5, the wheel 4 being driven by a suitable pinion 6 Fig. 3 mounted on the driving shaft of a suitable multiple headed power driven rotary filler such as the one which is described in my application for patent filed July 17, 1923, Serial Number 652,088, the present machine being timed to place siruped bottles on the bottle rests of the filler to be filled and then to take the filled bottles from the filler again for sealing. On the shaft 3 Fig. 1 is mounted a cam 7 which intermittently rotates a star wheel 8 carried on a pin 9 which is held by a casting 10 bolted to the frame 2. The star wheel 8 is connected to a bevel wheel 11 Fig. 2 by a coned ring 12 and three studs 13 to allow of adjusting the mechanism for wear. The bevel wheel 11 meshes with a bevel pinion 14 on a shaft 15 which is free to rotate in a bearing 16 on a stationary table 17. On the shaft 15 is a collar 18 on which is a ball race with balls 19 supporting a drum 20 which is free to revolve round the shaft 15. On the top of the drum 20 is a collar 21 which is keyed by a key 22 to the shaft 15. On the top of the collar 21 is a drum 23 free to revolve round the shaft 15 and a ball race is formed in the drum 23 and fitted with balls 24 which are held in position by a plate 25, locking ring 26, and cap nut 27, screwed on the shaft 15. The two drums 20 and 23 are free to revolve on the shaft 15 independently of each other. In the top of the shaft 15 is an oil well 28 that is closed by the cap nut 27 which is also provided with a detachable plug 29, oil being led to all bearing surfaces by suitable channels. On the cam 7 is fixed in a suitable position a cam 30 which intermittently raises or lowers a rod 31 passing through the casting 10 and having an adjustable shoe 32 that can be adjusted by a set screw 33 and secured by a lock nut 34. On the shoe 32 rests one end of a lever 35 that is fulcrumed on a pin 36 carried by the casting 10. The other end of the lever 35 is supported by a flanged stud 37 screwed into a plunger 38 and secured by a nut 39. The plunger 38 is connected to a shaft 40 by a rod 41 and pins 42 and 43, the latter being connected to a crank 44 that is secured to the shaft 40 by a key 45. The shaft 40 is journaled in bearings in the shaft 15 and collar 21, and is arranged crosswise of the shaft 15. The shaft 40 is rotated intermittently by the shaft 15 about the axis of the latter and it is also oscillated on its own horizontal axis by the cam 30, rod 31, shoe 32, lever 35, flanged stud 37, plunger 38, rod 41, and crank 44. On the shaft 40 is fixed a bevel pinion 46 (Fig. 3) by a key 47 and nut 48 so that when the shaft 40 is partly rotated the bevel pinion 46 also moves. One side of the bevel pinion 46 meshes with bevel teeth 49 on the drum 20 and the other side of the bevel pinion meshes with bevel teeth 50 on the drum 23 thus when the shaft 40 is oscillated the bevel pinion 46 turns the drum 20 in one direction and the drum 23 in the opposite direction, the drums 20 and 23 being brought back into their original position by springs 51 which are attached to each drum on pegs 52 and to the collar 21 on pegs 53. On the drums 20 and 23 are mounted metal arms 54 for gripping bottles of varying diameters. As the machine is put in motion a bottle is placed in the position marked A on the table 17, Fig. 3, the cam 30 Fig. 1 then releases the rod 31 thus allowing the springs 51 to rotate the drums 20 and 23 thereby causing the arms 54, Fig. 3, to grip each side of the bottle, the cam 7 Fig. 1 then rotates the star wheel 8 a sufficient distance to take the bottle to the position B, Fig. 3, under the siruping head cone 55, Fig. 1. The cam 30 then lifts the rod 31 thus opening the arms 54 to release the bottle whilst in the centre of the bottle rest 56 which is then operated by a cam 57, roller 58, pin 59, slide 60, spring 61, sleeve 62, thus in a known manner raising the bottle against siruping head cone 55. Further movement of the cam 57 causes the bottle to raise the cone 55, a plunger 63 containing a check valve 64 and a spring 65 and washer 66 thus opening a valve 67 when a washer 68 comes against a sleeve 69 carrying pump packing washers 70 and 71, secured to the sleeve 69 by a nut 72. These washers are then forced upwards thereby injecting sirup contained in a pump barrel 73 past the valve 67 through a passage 74, past the valve 64 and into the bottle which is clamped between the siruping head and the bottle rest. The cam 57 then releases the bottle rest which returns to its original level and the bottle also comes down away from the cone 55 thus allowing the plunger 63 to fall thereby closing the valve 67 and pulling the sleeve 69 and pump packings 70 and 71 down the barrel 73 thus drawing in a further charge of sirup past a spring controlled valve 75 from a chamber 76 which may be in any position. The plunger 63 is brought downwards by springs 77 on rods 78 during the suction stroke of the pump packings 70 and 71, the rods 78 being screwed to the pump case 79 which is fixed to a bridge 80. The rods 78 extend upwards to hold the pump head 81 in position and such head is fitted with an air release valve 82, which can be opened by hand to allow any air which has got into the pump cylinder to escape, so that the pump can be filled with sirup. After several bottles have been placed in the position A, Fig. 3, transferred to position B, siruped and moved to position C on the filling machine, they commence to come out of the latter at position D where the arms 54 get hold of the bottles in turn and move them to position E on the bottle rest for sealing and after sealing to position F so that the operator can take them from the machine. The bottle rest 83 Fig. 1, is raised by a cam 84, roller 85, pin 86, plunger 87, spring 88, and sleeve 89 thus taking each bottle in turn up to the crowning head cone 90 where it is sealed in a usual manner, the seal on the bottle coming into contact with a plunger 91, raising same and thus causing a lever 92 to rock on its pin 93 and operate a pawl 94 which allows one more seal or crown to fall down a chute 95 to replace the one taken from the chute and placed on to the bottle. This pawl 94 is a gravity actuated pawl provided with two detents which are thrust alternately through openings in the chute 95. Each time the lever 72 is operated a seal is trapped in the space between the two detents and is then discharged, and another seal is allowed to enter the chute, thus keeping a constant number of seals or crowns in the chute 95 which obviates the bottle being occasionally retained in the cone 90 when the bottle rest 83 comes down, this holding of the bottle being due to the weight of a much larger number of seals or crowns wedging against the bottle neck. The seal or crown hopper 96 is of usual construction and is supported by a pillar 97 and crown head 98 on the bridge 80. Each end of the latter carries a rotary sleeve formed with a worm wheel 99 at one end and each sleeve is screwed internally to screw up or down pillars 100 attached to the table 17, the weight of the bridge 80 and its attendant parts being supported by collars 101 on the worm wheel sleeves. The worm wheels 99 are geared together by two worms 102 Fig. 2 fixed on a shaft 103 that is held in two bearings 104 on the bridge 80 and such worms 102 are rotated by a hand wheel 105 so that the bridge 80 can be brought nearer to or further away from the table 17 to take bottles of different lengths. Apparatus within the hopper 96 for keeping the crown cork seals in motion comprises any approved agitating device inside the hopper, and any approved driving mechanism for operating the same. The driving mechanism shown comprises intermeshing helical wheels 106 and 107, the latter secured on a vertical shaft 108 as shown in Fig. 1, and a worm wheel 109 shown in Fig. 3, which meshes with a worm wheel 110 shown in Fig. 1 and which is mounted on the shaft 3. The latter wheel has dog clutch teeth (not shown) on its outer face to engage with similar teeth on the wheel 4 and the wheel 110 is free to slide out of engagement with the wheel 4 owing to the action of a spring 111. When the machine is used for bottle transferring and sealing only, the cam 57 (shown in the disconnected position) is moved from under the roller 58 by a lever 112 Fig. 2, which slides on a rod 113 Fig. 2 with the result that the bottle rest 56 is not raised and no bottles are siruped. When the machine is used for siruping and transferring bottles only when the bottles are not of a type which the machine can seal or crown, the cam 84, Fig. 1 is moved along the shaft 3, out of the path of the roller 85, by a lever 112$^A$ as shown in Fig. 7, consequently the bottle rest 83 is not raised and no bottle can go up to the sealing or crowning cone 90 so that the bottles are brought out to the operator without being closed. The action of the lever 112$^A$ in disengaging the cam 84 from the roller 85 also allows a fork 114 Figs. 1 and 2 to come away from the wheel 110 which is then pushed out of engagement with the aforesaid clutch teeth on the wheel 4 by the spring 111 thus allowing the wheel 110 and the hopper agitating mechanism to remain stationary. When the machine is required to seal or crown bottles, the lever last mentioned is moved along the shaft 113 to slide the cam 84 under the roller 85 which then puts the bottle rest 83 into action for raising the bottles to be sealed or crowned and it also moves the fork 114 to force the wheel 110 into engagement with the wheel 4 thus putting the hopper agitating mechanism in motion for feeding seals or crowns to the chute 95 and cone 90 ready to be pressed on to the bottle necks. The automatic knock off motion shown in Fig. 4 for stopping the machine when bottles are left on the table 17 instead of being removed from the position F Fig. 3, comprises a trigger 115 connected by a squared shaft 116 to a lever 117 which is held in the position shown by a spring 118 thus holding a catch 119 against a slide rod 120 which is free to slide in a bracket 121 on the table 17. This catch mechanism is of any approved construction. The catch 119 shown is pivoted to the lever 117, and is slidable in a guideway in the bracket 121. The slide rod 120 is coupled by a pin 122 Fig. 3 to a clutch lever 123 Fig. 3 of a suitable multiple headed power driven rotary filler such for example as the one which is described in my aforesaid application for patent so that when the clutch lever 123 is pulled into its driving position the catch 119 engages with a nick 124 in the slide rod 120 thus holding the clutch lever 123 in its driving position whereupon the pulley 125 is caused to engage with a clutch 126 on the multiple headed rotary filler 127 thus driving the latter and also the siruping, bottle transferring and sealing or crowning machine by means of the pinion 6 which meshes with the wheel 4. When a bottle is left in the position F Fig. 3 the arms 54 again grip the bottle and try to move it to the position A, but the trigger 115 is in the path of the bottle and is therefore forced towards the position A, thus pulling the catch 119 out of the nick 124 and releasing the rod 120 which then allows the clutch lever 123 to move the pulley 125 out of engagement with the clutch 126 owing to the action of a spring 128 thus stopping both the filler and the siruper transferrer and sealer.

What I claim as my invention and desire to secure by Letters Patent in the United States, is:—

1. In a combined bottle siruping and sealing machine provided with a siruping head head and a sealing head, automatic bottle transferring apparatus adapted to convey bottles to the siruping head, to transfer them from the latter to a rotary filling machine, to take the filled bottles from the last mentioned machine and place them underneath the sealing head and to transfer the sealed bottles to a position in which they can be removed from the siruping and sealing machine by the operator, and means for automatically stopping the machine in the event of a bottle not being removed by the operator after being transferred from underneath the sealing head, to the taking off position, the said means comprising a trigger lever situated in the path of a bottle, a two-armed lever rigidly connected with said trigger lever, a catch pivotally connected with one arm of the said two-armed lever, a guide for said catch, a slidable member having a notch for said catch, a spring for maintaining said catch in said notch, a clutch lever connected with said slidable member, a driving pulley slidably mounted on a shaft, a clutch adapted to engage said driving pulley, and a spring adapted to disengage the driving pulley from the clutch when the catch is disengaged from the slidable member.

2. In a combined bottle siruping and sealing machine, the combination, of a siruping head, a sealing head, a rising and falling bottle rest appertaining to each head, a driving shaft, a cam appertaining to each bottle rest, each cam being slidably keyed on the said shaft, and a hand lever for sliding each said cam into and out of its operative position with relation to its respective bottle rest.

In testimony whereof I affix my signature.

WILLIAM MEADOWCROFT.